United States Patent
Ciubotariu et al.

(10) Patent No.: US 10,846,405 B1
(45) Date of Patent: Nov. 24, 2020

(54) SYSTEMS AND METHODS FOR DETECTING AND PROTECTING AGAINST MALICIOUS SOFTWARE

(71) Applicant: Symantec Corporation, Mountain View, CA (US)

(72) Inventors: Mircea Ciubotariu, Culver City, CA (US); Dumitru Stama, Marina Del Rey, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 197 days.

(21) Appl. No.: 16/011,962

(22) Filed: Jun. 19, 2018

(51) Int. Cl.
  *G06F 21/53* (2013.01)
  *G06F 21/56* (2013.01)
  *G06F 9/455* (2018.01)
  *G06F 21/55* (2013.01)

(52) U.S. Cl.
  CPC ............ *G06F 21/566* (2013.01); *G06F 9/455* (2013.01); *G06F 21/53* (2013.01); *G06F 21/554* (2013.01); *G06F 21/565* (2013.01)

(58) Field of Classification Search
  CPC ................................ G06F 21/53; G06F 21/566
  See application file for complete search history.

(56) References Cited

U.S. PATENT DOCUMENTS

| | | | | |
|---|---|---|---|---|
| 10,521,588 | B1* | 12/2019 | Huang | G06F 21/53 |
| 2004/0015712 | A1* | 1/2004 | Szor | G06F 21/566 726/24 |
| 2012/0260342 | A1* | 10/2012 | Dube | G06F 21/564 726/24 |
| 2013/0174182 | A1* | 7/2013 | Kieffer | G06F 9/445 719/331 |
| 2015/0371047 | A1* | 12/2015 | Mendelev | G06F 21/563 726/25 |
| 2016/0196425 | A1* | 7/2016 | Davidov | G06F 21/566 726/23 |
| 2019/0005226 | A1* | 1/2019 | Boutnaru | G06F 21/554 |
| 2019/0034632 | A1* | 1/2019 | Tsao | G06F 21/563 |

* cited by examiner

*Primary Examiner* — David J Pearson
(74) *Attorney, Agent, or Firm* — FisherBroyles, LLP

(57) ABSTRACT

The disclosed computer-implemented method for detecting and protecting against malicious software may include loading an untrusted application having a defined entry point into an emulated computing environment, executing a first instance of the untrusted application in the emulated computing environment beginning at the defined entry point, executing a second instance of the untrusted application beginning at a second entry point downstream from the defined entry point so as to bypass at least a portion of the untrusted application executed in the first instance, identifying the untrusted application as a potential threat based on information extracted from the second instance of the untrusted application, and performing a security action to protect against the untrusted application identified as a threat. Various other methods, systems, and computer-readable media are also disclosed.

20 Claims, 6 Drawing Sheets

SYSTEMS AND METHODS FOR DETECTING AND PROTECTING AGAINST MALICIOUS SOFTWARE

BACKGROUND

Malware, short for malicious software, is software having a malicious intent and includes computer viruses, worms, Trojan horses, spyware, adware, and other harmful programs. Such software is harmful to a computer system and considerable effort has been made developing methods and systems for identifying malware to prevent it from being executed on a system. Once identified, malware may be detected by its signature. Modern malware, however, is often polymorphic, changing in filename, compression method, encryption keys, or other variation. In other instances, malware may be previously unidentified. In these situations, it may not be possible to identify the malware without executing the software. Since a goal of malware detection systems is to prevent malware from being executed on a system, modern malware detection systems may emulate an operating system to provide a protected environment for executing the potential malware. If the malware detection system detects a threat, it may shut down the emulated computing environment and perform a security action on the identified threat before it has a chance to run on the actual system.

As malware detection systems advance in their ability to detect threats, the threats themselves become more advanced. More recently, malware have developed anti-emulation techniques designed to detect if the malware is being executed in an emulated computing environment. For example, the malware may call a function not typically present in an emulated computing environment or test for the presence of a specific file. If the malware detects an emulated computing environment, it may terminate without triggering any action that would indicate it as a threat.

A malware detection system should be able to accurately detect threats while introducing minimal latency into the system. To reduce latency, emulators often provide a simplified environment that can be executed with relatively little resources. However, advanced malware may be able to detect these environments and terminate prior to detection, thereby escaping the malware detection system. A more advanced emulated computing environment may be provided to run the potential malware, at the expense of requiring additional resources and increasing latency. The instant disclosure, therefore, identifies and addresses a need for improved systems and methods for detecting and protecting against malicious software.

SUMMARY

As will be described in greater detail below, the instant disclosure describes various systems and methods for detecting and protecting against malicious software.

In one embodiment, a method for detecting and protecting against malicious software may include loading an untrusted application into an emulated computing environment, the untrusted application having a defined entry point, executing a first instance of the untrusted application in the emulated computing environment beginning at the defined entry point, executing a second instance of the untrusted application beginning at a second entry point downstream from the defined entry point so as to bypass at least a portion of the untrusted application executed in the first instance, identifying the untrusted application as a potential threat based on information extracted from the second instance of the untrusted application, and performing a security action to protect against the untrusted application identified as a threat.

In some examples, the method further includes analyzing the untrusted application for heuristic hints to identify the second entry point. In some examples, the heuristic hints include at least one of string concatenations, strings composed from hexadecimal codes, abnormal code constructs, and variable name entropy.

In some examples, the method further includes executing a third instance of the untrusted application beginning at a third entry point downstream from the defined entry point and the second entry point.

In some examples, the first instance of the untrusted application terminates prior to running a payload. In some examples, the second instance of the untrusted application runs the payload.

In some examples, the untrusted application is a script having statements and the second entry point may be the beginning of a statement.

In some examples, the second entry point may be an application programming interface import location in a portable executable file.

In another embodiment, a system for detecting and protecting against malicious software may include at least one physical processor and physical memory having computer-executable instructions that, when executed by the physical processor, cause the at least one physical processor to load an untrusted application into an emulated computing environment, the untrusted application having a defined entry point, execute a first instance of the untrusted application in the emulated computing environment beginning at the defined entry point, execute a second instance of the untrusted application beginning at a second entry point downstream from the defined entry point, and identify the untrusted application as a potential threat based on information extracted from the second instance of the untrusted application.

In some examples, the computer executable instructions further cause the at least one physical processor to analyze the untrusted application for heuristic hints to determine the second entry point. In some examples, the heuristic hints include at least one of string concatenations, strings composed from hexadecimal codes, abnormal code constructs, and variable name entropy.

In some examples, the computer executable instructions further cause the at least one physical processor to load a script having statements, wherein the second entry point may be the beginning of a statement.

In some examples, the computer executable instructions further cause the at least one physical processor to load a portable executable at a second entry point having an application programming interface import location.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to load an untrusted application into an emulated computing environment, the untrusted application having a defined entry point, execute a first instance of the untrusted application in the emulated computing environment beginning at the defined entry point, execute a second instance of the untrusted application beginning at a second entry point downstream of the defined entry point so as to bypass at least a portion of the untrusted application executed in the first instance, and identify the untrusted application as a potential threat based on information extracted from the second instance of the untrusted application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
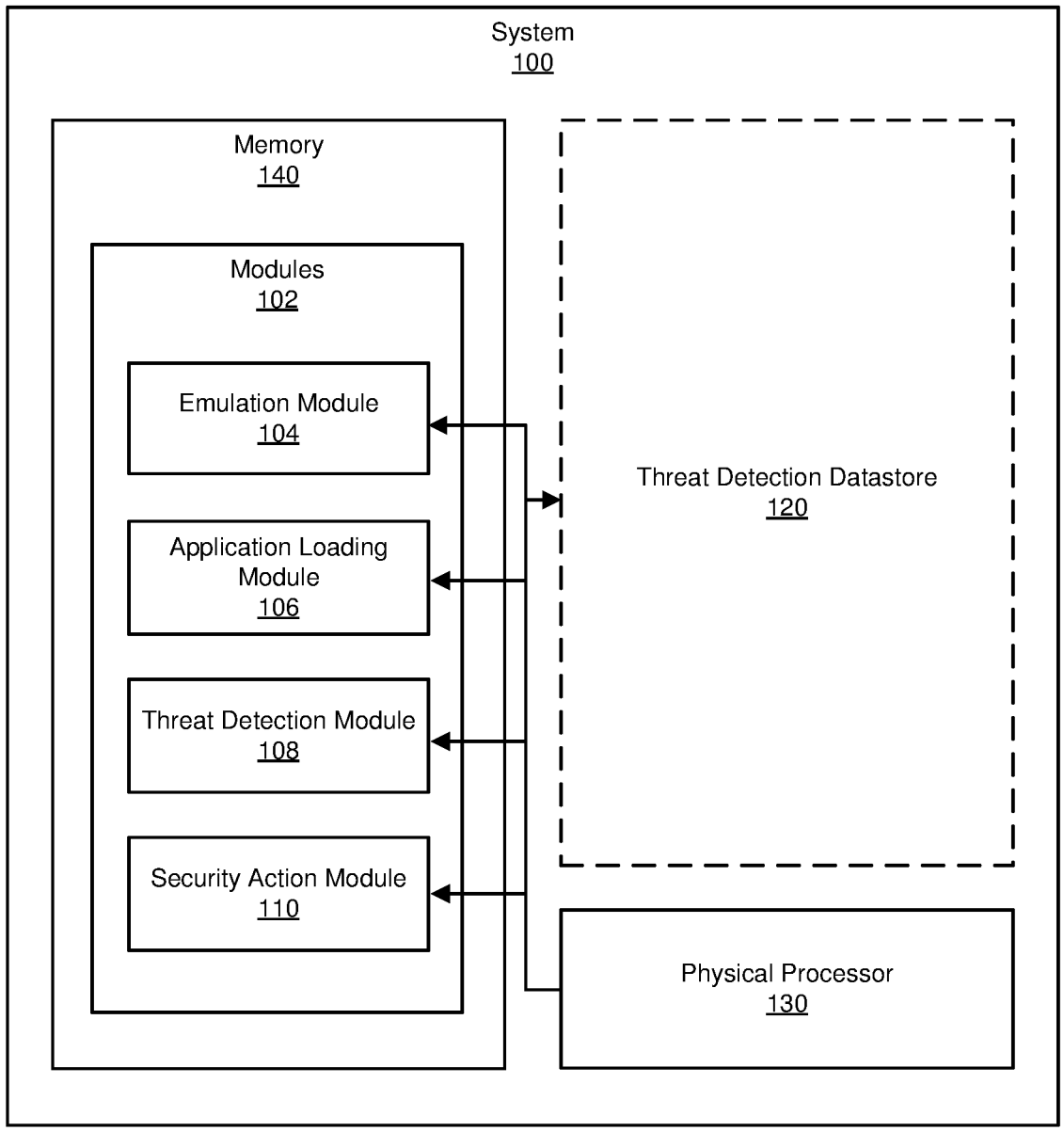
FIG. 1 is a block diagram of an example system for detecting and protecting against malicious software.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting and protecting against malicious software. The disclosed subject matter may be implemented to identify threats that may not normally operate in an emulated computing environment. Although many malicious software programs are designed to detect an emulated computing environment and terminate their operation, the disclosed subject matter may be able to thwart the detection of the emulated computing environment by malicious software by allowing the same to progress far enough for a malware detection system to detect the threat. As will be explained in greater detail below, by executing an untrusted application at entry points other than a defined entry point, the systems and methods described herein may be able to bypass the emulation checks performed by malicious software or result in the malicious software otherwise exposing a hidden functionality or payload.

In addition, the systems and methods described herein may improve the functioning of a computing device by detecting malicious files with increased accuracy without significantly increasing the complexity of the emulated computing environment. Thus, the systems and methods may reduce the computing device's likelihood of infection while minimizing latency introduced by the malware detection system.

Figure 2:
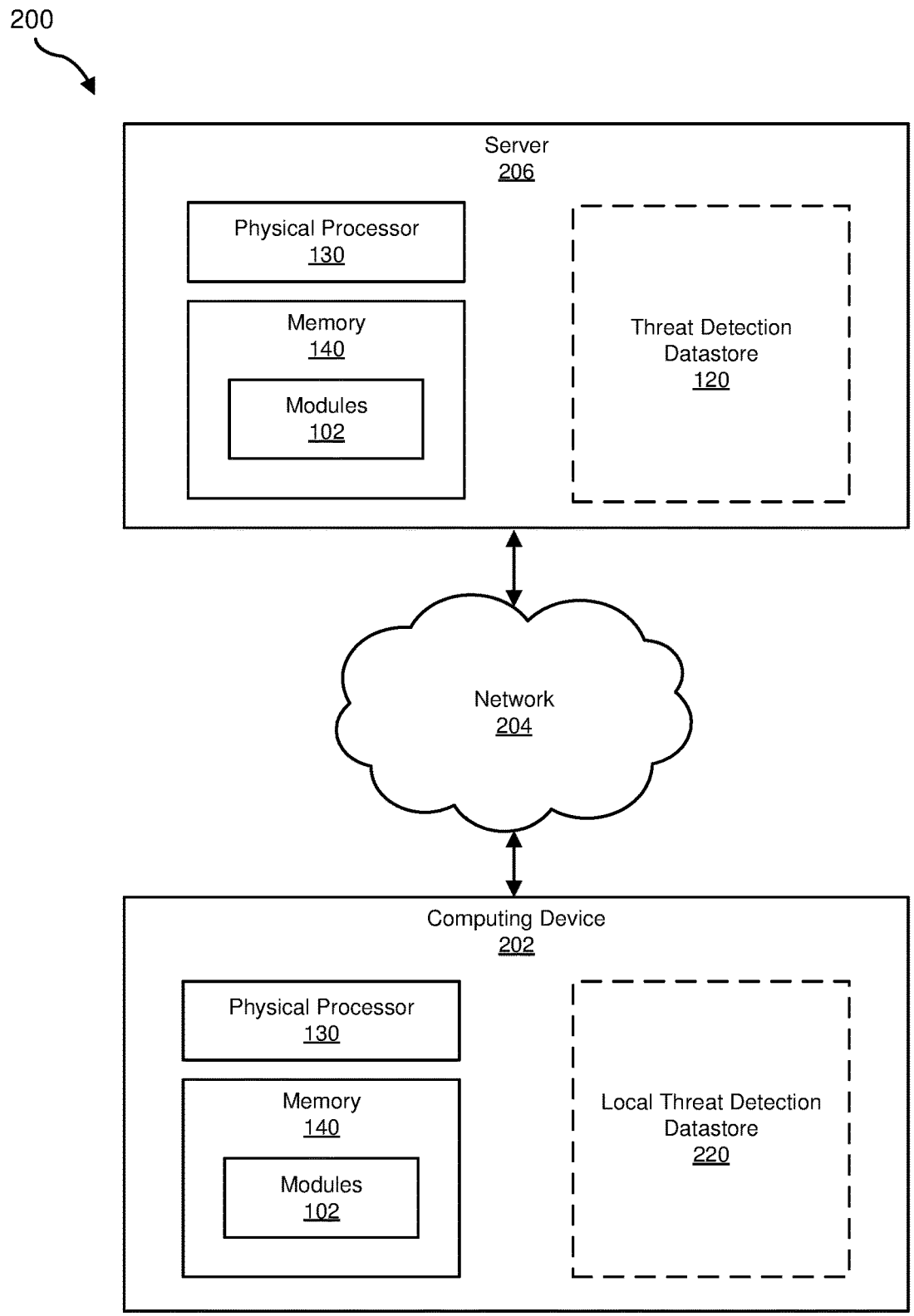
FIG. 2 is a block diagram of an additional example system for detecting and protecting against malicious software.

The following will provide, with reference to FIGS. 1-2, detailed descriptions of example systems for detecting and protecting against malicious software. Detailed descriptions of corresponding computer-implemented methods will also be provided in connection with FIG. 3. FIG. 4 will provide a high-level reference to a script illustrating potential alternative entry points to a script. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting and protecting against malicious software. As illustrated in this figure, example system 100 may include one or more modules 102 for performing one or more tasks. As will be explained in greater detail below, modules 102 may include an emulation module 104, an application loading module 106, a thread detection module 108, and a security action module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting and protecting against malicious software. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more datastores containing information for the detection of threats, such as threat detection datastore 120. Threat detection datastore 120 generally represents any type or form of computer-readable storage memory storing information for the detection of malicious software. In one example, threat detection datastore 120 may contain examples of heuristic behaviors of malicious software and/or signatures of known malicious software.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect malicious software. For example, and as will be described in greater detail below, one or more of modules 102 may cause computing device 202 and/or server 206 to emulate a compute environment, load an untrusted application into the emulated computing environment, execute a first instance of the untrusted application in the emulated computing environment beginning at a defined entry point of the untrusted application, execute a second instance of the untrusted application beginning at a second entry point that is downstream from the defined entry point, and identify the untrusted application as a threat based on information extracted from the second instance of the untrusted application.

Computing device 202 generally represents any type or form of computing device capable of reading computer-executable instructions. In one example, computing device 202 is an endpoint device running client-side security software, such as a personal computer executing local security software to dynamically detect malicious software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing services to computing device 202. In one example, server 206 is an update server operable to provide updated threat definitions, detection algorithms and other security updates to computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Local threat detection datastore 220 generally represents any type or form of local storage containing data for the detection of malicious software. Local threat detection datastore 220 may be a locally cached copy of threat detection datastore 120 kept at server 206. Examples of local threat detection datastore 220 include, without limitation, a listing of software signatures, a listing of known malicious software actions, a weighting of malicious software actions, and instruction for performing a security action on malicious software.

Figure 3:
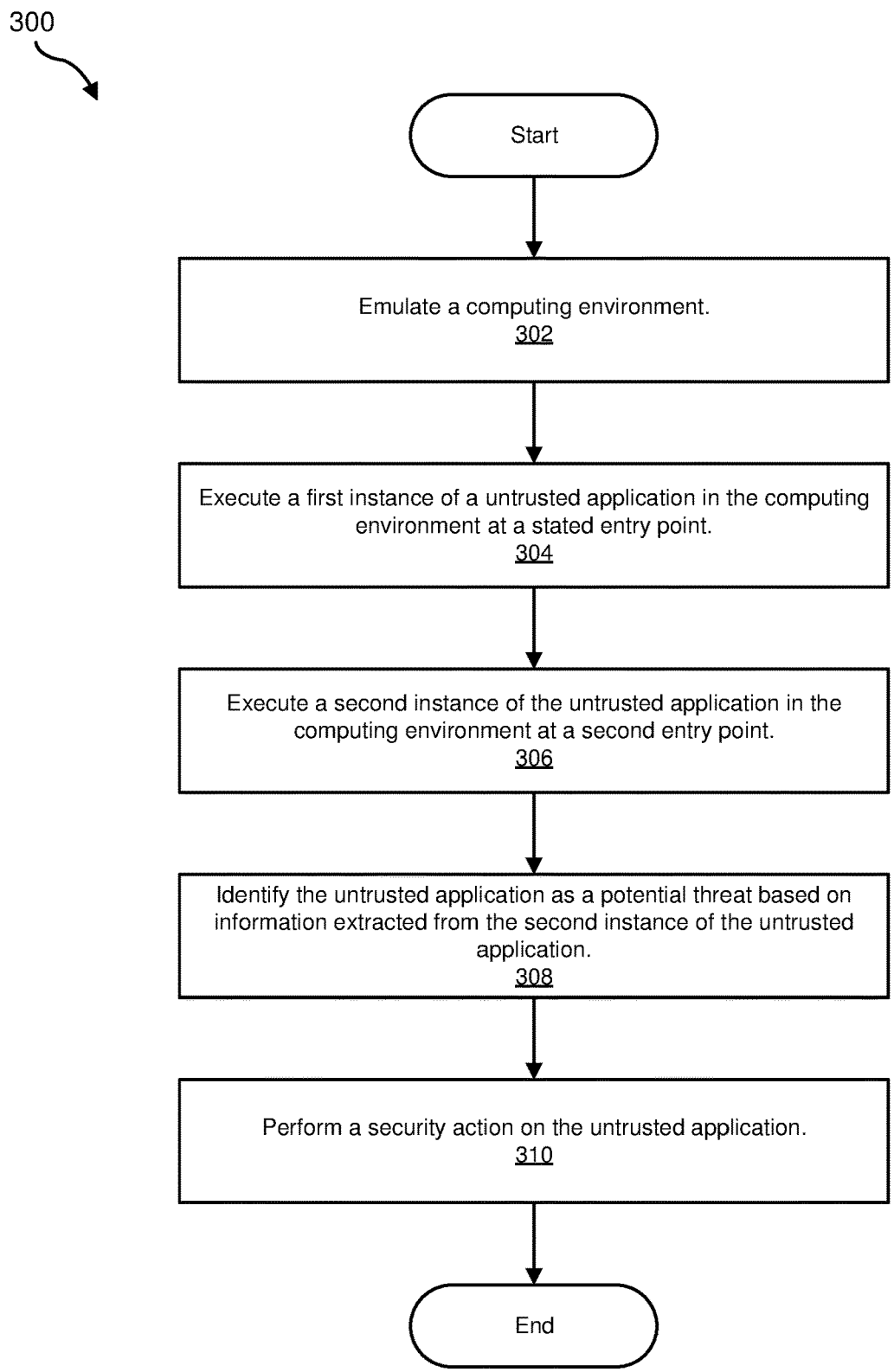
FIG. 3 is a flow diagram of an example method for detecting and protecting against malicious software.
Figure 4:
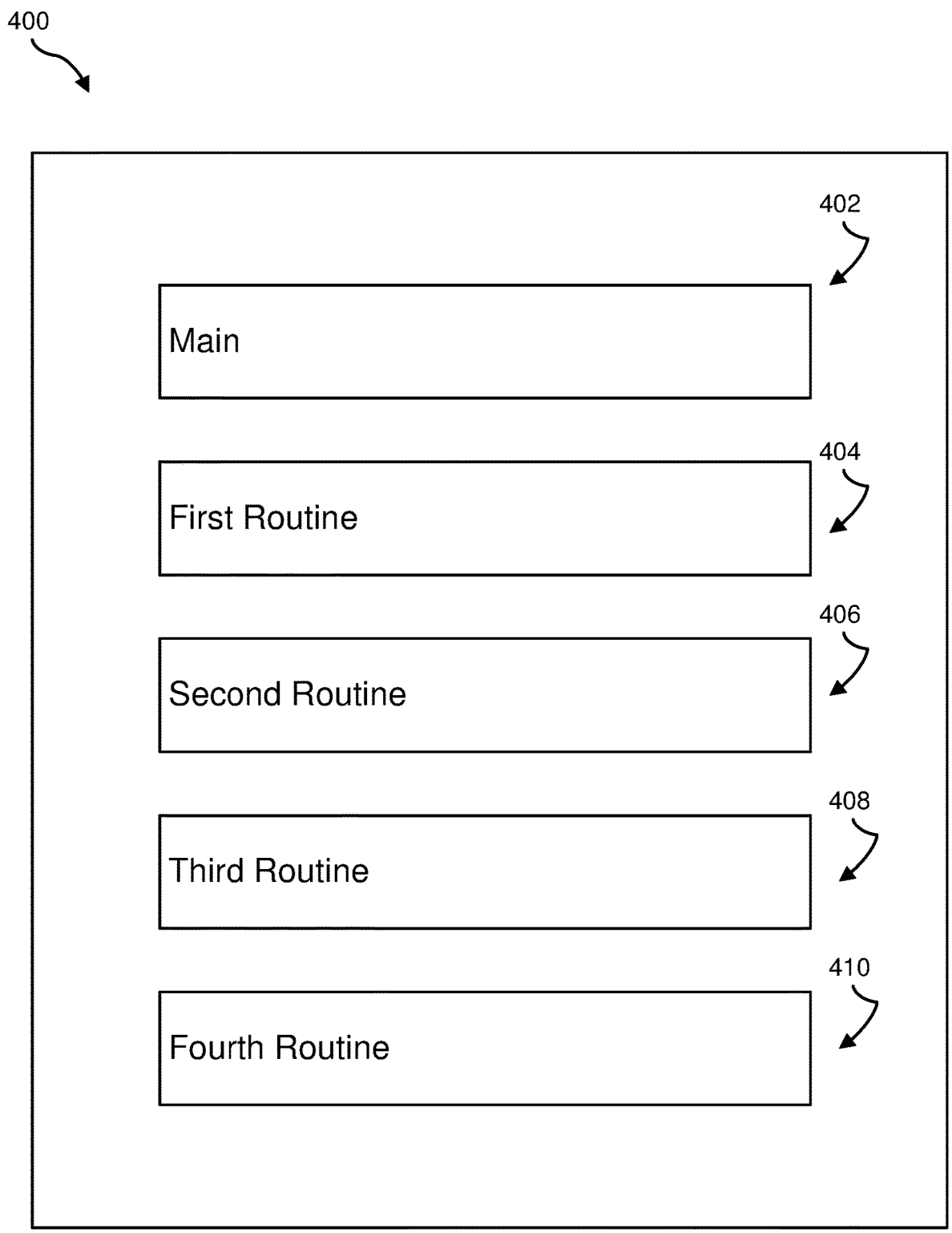
FIG. 4 is a block diagram of a script illustrating alternative entry points.

FIG. 3 is a flow diagram of an example computer-implemented method 300 for detecting and protecting against malicious software. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may emulate a computing environment. For example, emulation module 104 may, as part of computing device 202 in FIG. 2, emulate a host environment. In some examples, the term "emulate" may refer to causing a first computer system (host) to behave like another computer system (guest). By way of example and not limitation, computing device 202 may be the host by way of emulation module 104, while emulated host environment may be the guest. The emulated host environment may contain its own virtual memory, hard drive, registry, network, processes, and all necessary subsystems required to execute the potential malicious file and allow it to "believe" it has been executed by the actual computing device and not an emulated computing environment.

Emulation module 104 may track the interaction of an untrusted application with the emulated computing environment and pass the results to threat detection module 108 for analysis. Additionally, emulation module 104 isolates the execution of the untrusted application to prevent an actual malicious file from harming computing device 202. For example, physical processor 130 may execute emulation module 104 to emulate a host environment for execution of an untrusted application. In some examples, physical processor 130 may implement a virtual machine for implementation of the emulated computing environment.

As illustrated in FIG. 3, at step 304 one or more of the systems described herein may execute a first instance of an untrusted application in the emulated computing environment beginning at a defined entry point. In some examples, the term "untrusted application" may refer to any file that has not been classified as safe. By way of example and not limitation, an untrusted application may include new scripts, new executable files, unknown file types, recently changed files, and files previously marked as untrusted. For example, application loading module 106 may, as part of computing device 202 in FIG. 2, load the untrusted application for execution in emulation module 104. In some examples, the term "entry point" may refer to a point where control is transferred from the operating system to the application and the processor enters a program or a code fragment and execution begins. An application traditionally has a single defined entry point which may vary depending on the application type. For example, a script would typically begin execution at a first line of the script.

In the above example, the untrusted application may execute within the emulated computing environment of the emulation module 104 until a termination event occurs. For example, once the untrusted application has completed execution it may terminate normally. Or, if the untrusted application is a malicious application that is operable to detect its emulated computing environment, it may terminate prematurely. In some examples, the emulated computing environment may terminate the untrusted application prematurely. For example, if threat detection module 108 obtains sufficient information to determine the untrusted application is a threat, it may terminate the untrusted application at that time to conserve resources.

As illustrated in FIG. 3, at step 306 one or more of the systems described herein may execute a second instance of the untrusted application in the emulated computing environment beginning at a second entry point that is downstream from the defined entry point so as to bypass at least a portion of the untrusted application executed in the first instance. For example, application loading module 106 may, as part of computing device 202 in FIG. 2, load a second instance of the untrusted application for execution in emulation module 104. In step 306, instead of loading the untrusted application at the defined entry point, application loading module 106 loads the application at an alternative entry point. For example, instead of executing a script from a first line, application loading module 106 may enter the script beginning at a statement within the script. Thus, a portion of the script may execute with the emulated computing environment, bypassing the beginning of the script. If the beginning of the script contained code for probing the environment to test for emulation, it will be bypassed by proceeding directly to the statement within the script. The second instance of the untrusted application executes within the emulated computing environment of the emulation module 104 until a termination event occurs.

Emulation module 104 may communicate information about the activities of the untrusted applications executing within the emulated computing environment to threat detection module 108. For example, emulation module 104 may report files that the untrusted application attempts to modify, write attempts by the untrusted application, registry changes, file scanning by the untrusted application, or other suspicious activity. As illustrated in FIG. 3, at step 308 one or more of the systems described herein may identify the untrusted application as a threat based on information extracted from the second instance of the untrusted application. For example, the first instance of untrusted application running in the emulated computing environment may terminate without threat detection module 108 detecting the untrusted application as a threat. This may occur as a result of the emulated computing environment failing a check by the untrusted application, resulting in the untrusted application terminating before executing its regular payload. A second instance of the untrusted application running in the emulated computing environment, executed at an entry point downstream from the defined entry point, may execute the payload of the untrusted application, or implement other functions not performed when the untrusted application is executed from its defined entry point. Emulation module 104 may provide the information gathered from the second instance of the untrusted application to threat detection module 108. The information may then be used by threat detection module 108 to identify the untrusted application as a threat.

As illustrated in FIG. 3, at step 310 one or more of the systems described herein may perform a security action in response to threat detection module 108 identifying the untrusted application as a threat. In some examples, the term "security action" may refer to an action taken by a computing device to enforce a security policy. By way of example and not limitation, security actions may include quarantining an untrusted application, deleting an untrusted application, flagging an untrusted application as a threat, or alerting a user for further action. For example, threat detection module 108 executing on physical processor may identify untrusted application running in emulated computing environment as a threat. Security module 110 may then perform a security as described previously.

FIG. 4 illustrates a high-level example of a script 400. Script 400 has a main portion 402, first routine 404, second routine 406, third routine 408, and fourth routine 410. An example of method 300 as implemented with script 400 will be described. Although this example is given in the context of script 400, one of ordinary skill in the art will recognize that the described method 300 is applicable to other executable file types. For example, in place of routines, a portable executable file may enter execution at an application programming interface import location.

Referring to FIGS. 1, 3, and 4, application loading module 106 may load script 400 into an emulated computing environment provided by emulation module 104. Application loading module 106 may first execute script beginning at a defined entry point, typically the main routine of the script. Application loading module 106 may also analyze the script to determine other potential entry points. For example, application loading module 106 may recognize first routine 404, second routine 406, third routine 408, and fourth routine 410 as potential entry points. In some examples, application loading module 106 may analyze the script in parallel with a first instance of the script running in the emulated computing environment. Or in other examples, application loading module 106 may analyze the script before running the script in the emulated computing environment.

Application loading module 106 may analyze each entry point to find heuristic hints indicating high value entry points. A high value entry point may represent an entry point that is more likely to trigger a payload of a malicious file. For example, various patterns such as a large number of string concatenations, large number of strings composed of hexadecimal codes, abnormal code constructs, and variable name entropy are each indications of potential malicious scripts and are therefore considered to more likely to trigger a payload. Because a script may have a large number of routines and other entry points, to reduce latency and increase performance, it may be desirable to only attempt to run the script at entry points that have a high value. In some examples, application loading module 106 may attempt to load the script at each potential entry point. Each instance of the script with a different entry point may implemented in parallel, sequentially, or in a combination depending on available resources. For example, if there are abundant resources, emulation module 104 may implement as many emulated computing environments as there are entry points to be tested and application loading module 106 may load an instance of the script with each entry point having a respective emulated computing environment. In other examples, the instances may be implemented in series, beginning with the main script, and if no threat is detected, loading a second instance of the script at a second entry point. This process may continue until an instance of the script is detected as a threat, or until the script has been tested with each entry point.

In the example script of FIG. 4, application loading module 106 may identify first routine 404, second routine 406, third routine 408, and fourth routine 410 as potential entry points. Additionally, application loading module 106 may recognize at least one of the routines, for example third routine 408, as containing heuristic hints indicating a higher value than other routines. Application loading module 106 may then load script 400 into emulator module 104 for execution in emulated computing environment with third routine 408 as an entry point. Emulator module 104 then executes the script beginning at third routine and communicates the scripts interaction with the environment to threat detection module 108.

Application loading module 106 may identify an additional routine, such as second routine 406, as containing heuristic hints indicating a high value. Second routine 406 heuristic hints may have a lower weight that heuristic hints of third routine 408, therefore second routine 406 may be executed with a lower priority than third routine 408. This process continues until each entry point has been utilized or until a set limit has been reached.

If threat detection module identifies script 400 as containing a threat, whether resulting from the main entry point or an alternative entry point, it identifies script 400 as being a threat and passes the identification to the security module 110 for performing a security action.

As detailed above, the disclosed subject matter may be able to detect malicious software that is designed to detect emulated computing environments. By entering the execution of the potentially malicious software at entry points other than the defined entry point, the disclosed subject matter may be able to trigger a payload or allow the malicious software to exhibit identifying characteristics that would otherwise remain hidden. For example, if malicious software is designed to probe the emulated computing environment to test for emulation prior to triggering its payload or performing an action, by entering the software program at an alternative entry point, the malicious software may not perform the emulation test prior to triggering its payload. Thus, a simplified emulation environment may be used in place of a resource intensive complete environment that would pass all possible checks by the malicious software.

Figure 5:
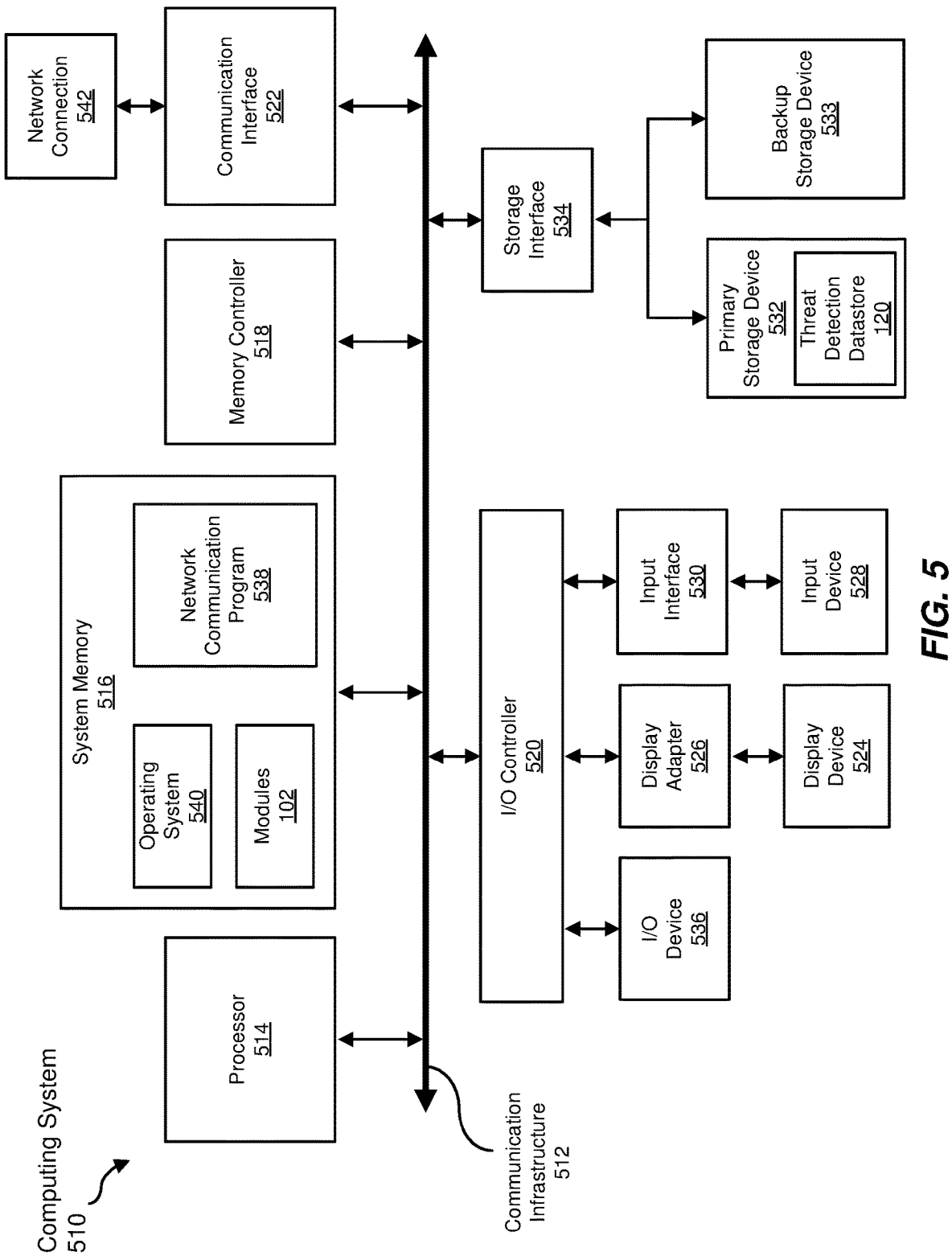
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, thread detection datastore 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
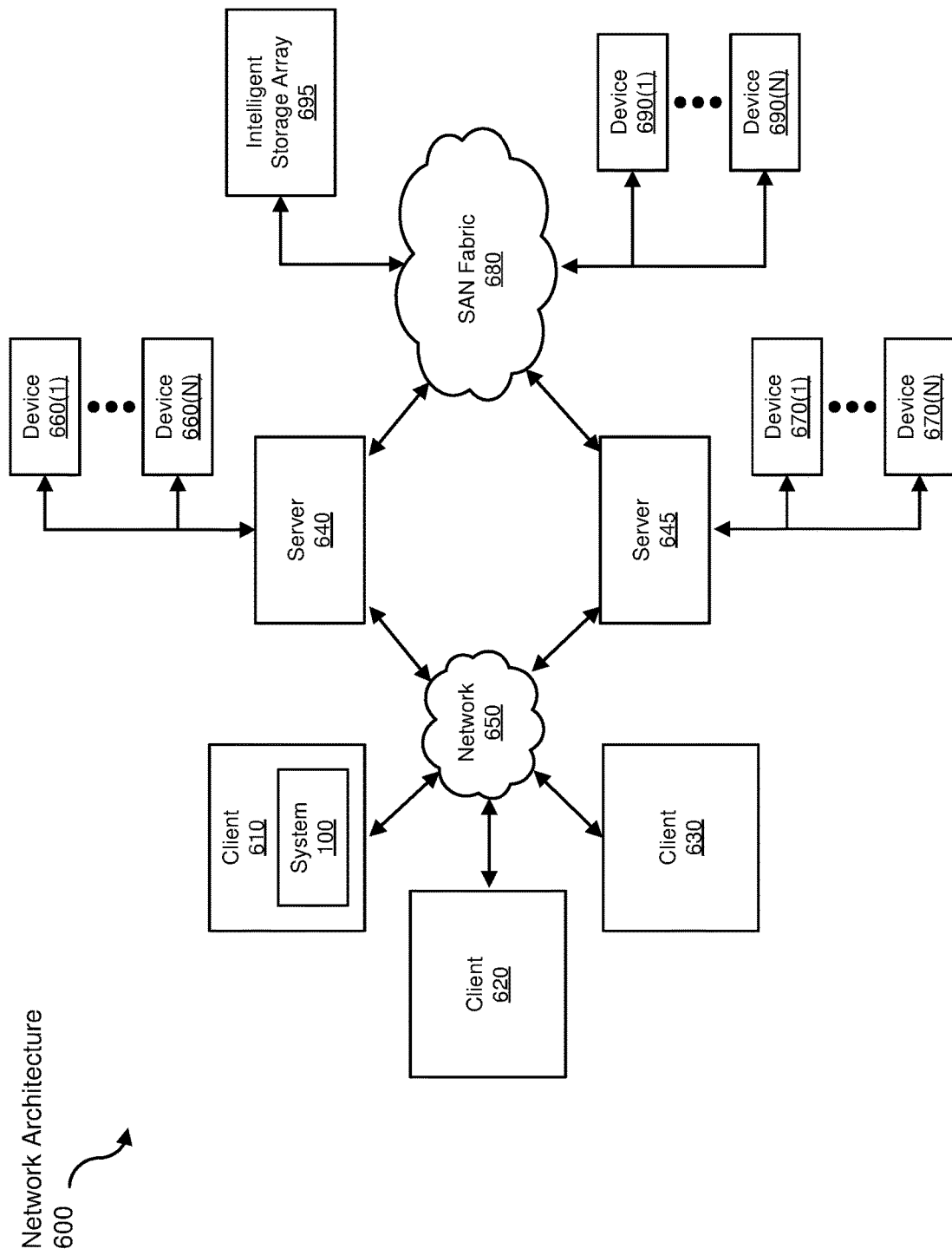
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting and protecting against malicious software.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive potentially malicious software, run the potentially malicious software in an emulated computing environment to determine the potentially malicious software's obscured payload, transform the obscured payload into a format readily observable by a threat detection application, output a result of the transformation to the threat detection module, use the result of the transformation to detect a threat, and perform a security action on the potentially malicious software based on the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting and protecting against malicious software, at least a portion of the method being performed by a computing device comprising at least one processor, the method comprising:
   loading an untrusted application into an emulated computing environment, the untrusted application having a defined entry point;
   executing a first instance of the untrusted application in the emulated computing environment beginning at the defined entry point;
   identifying, by analyzing a plurality of additional entry points of the untrusted application, an additional entry point that is likely to trigger a payload;
   prioritizing the additional entry point over other additional entry points for execution as a second entry point;
   executing a second instance of the untrusted application beginning at the second entry point that is downstream from the defined entry point so as to bypass at least a portion of the untrusted application executed in the first instance;
   identifying the untrusted application as a threat based on information extracted from the second instance of the untrusted application; and
   performing a security action to protect against the untrusted application identified as a threat.

2. The computer-implemented method of claim 1, further comprising:
   analyzing the untrusted application for heuristic hints to identify the second entry point.

3. The computer-implemented method of claim 2, wherein the heuristic hints comprise at least one of string concatenations, strings composed from hexadecimal codes, abnormal code constructs, and variable name entropy.

4. The computer-implemented method of claim 1, further comprising:
   prioritizing one of the other additional entry points for execution as a third entry point;
   executing a third instance of the untrusted application at the third entry point downstream from the defined entry point and upstream of the second entry point, wherein, based on priority, the third instance is executed at the third entry point subsequent to execution of the second instance at the second entry point.

5. The computer-implemented method of claim 1, wherein the first instance of the untrusted application terminates prior to running a payload and the second instance of the untrusted application runs the payload.

6. The computer-implemented method of claim 1, wherein identifying the untrusted application as a threat comprises at least one of identifying suspicious behavior of the untrusted application, identifying unpacking of malicious code, identifying the generation of autorun files, and identifying attempts to alter system files.

7. The computer-implemented method of claim 1, wherein the untrusted application is a script comprising statements, wherein the second entry point comprises the beginning of a statement.

8. The computer-implemented method of claim 1, wherein the second entry point comprises an application programming interface import location in a portable executable.

9. A system for detecting malicious software, the system comprising:
   at least one physical processor;
   physical memory comprising computer-executable instructions that, when executed by the physical processor, cause the at least one physical processor to:
   load an untrusted application into an emulated computing environment, the untrusted application having a defined entry point;
   execute a first instance of the untrusted application in the emulated computing environment beginning at the defined entry point;
   identify, by analyzing a plurality of additional entry points of the untrusted application, an additional entry point that is likely to trigger a payload;
   prioritize the additional entry point over other additional entry points for execution as a second entry point;
   execute a second instance of the untrusted application beginning at the second entry point that is downstream from the defined entry point so as to bypass at least a portion of the untrusted application executed in the first instance; and
   identify the untrusted application as a threat based on information extracted from the second instance of the untrusted application.

10. The system of claim 9, wherein the computer executable instructions further cause the at least one physical processor to analyze the untrusted application for heuristic hints to determine the second entry point.

11. The system of claim 10, wherein the heuristic hints comprise at least one of string concatenations, strings composed from hexadecimal codes, abnormal code constructs, and variable name entropy.

12. The system of claim 9, wherein the computer executable instructions further cause the at least one physical processor to load a script comprising statements, wherein a statement is used as the second entry point to the script.

13. The system of claim 9, wherein the computer executable instructions further cause the at least one physical processor to load a portable executable beginning at a second entry point comprising an application programming interface import location.

14. A non-transitory computer-readable medium comprising one or more computer-executable instructions that, when executed by at least one processor of a computing device, cause the computing device to:
   load an untrusted application into an emulated computing environment, the untrusted application having a defined entry point;

execute a first instance of the untrusted application in the emulated computing environment beginning at the defined entry point;

identify, by analyzing a plurality of additional entry points of the untrusted application, an additional entry point that is likely to trigger a payload;

prioritize the additional entry point over other additional entry points for execution as a second entry point;

execute a second instance of the untrusted application beginning at the second entry point downstream from the defined entry points as to bypass at least a portion of the untrusted application executed in the first instance; and identify the untrusted application as a threat based on information extracted from the second instance of the untrusted application.

15. The non-transitory computer-readable medium of claim 14, wherein the computer-executable instructions further cause the computing device to:

analyze the untrusted application for heuristic hints to determine the second entry point.

16. The non-transitory computer-readable medium of claim 15, wherein the heuristic hints are selected from the group consisting of string concatenations, strings composed from hexadecimal codes, abnormal code constructs, and variable name entropy.

17. The non-transitory computer-readable medium of claim 14, wherein the computer-executable instructions further cause the computing device to:

execute a third instance of the untrusted application at a third entry point downstream from the defined entry point and the second entry point.

18. The non-transitory computer-readable medium of claim 14, wherein the first instance of the untrusted application terminates prior to running a payload and the second instance of the untrusted application runs the payload.

19. The non-transitory computer-readable medium of claim 14, wherein the untrusted application is a script comprising statements, wherein a statement is used as the second entry point.

20. The non-transitory computer-readable medium of claim 14, wherein the second entry point comprises an application programming interface import location in a portable executable.

\* \* \* \* \*